United States Patent [19]

Mineshima

[11] Patent Number: 4,490,031
[45] Date of Patent: Dec. 25, 1984

[54] DEVICE FOR ADJUSTING MOVEMENT OF PHOTOGRAPHIC LENS AND FIELD OF VIEWFINDER

[75] Inventor: Makoto Mineshima, Tokyo, Japan

[73] Assignee: Kabushiki Kaisha Velonar, Tokyo, Japan

[21] Appl. No.: 418,578

[22] Filed: Sep. 15, 1982

[51] Int. Cl.³ .................. G03B 3/10; G03B 17/00
[52] U.S. Cl. .................. 354/402; 354/481; 354/295
[58] Field of Search .............. 354/25, 59, 295, 402, 354/481

[56] References Cited

U.S. PATENT DOCUMENTS

| 2,674,932 | 4/1954 | Tydings et al. | 354/295 X |
| 3,610,127 | 10/1971 | Ruhle | 354/25 |
| 3,618,499 | 11/1971 | Harvey | 354/25 X |
| 4,219,264 | 8/1980 | Rodeck | 354/295 X |

Primary Examiner—Michael L. Gellner
Attorney, Agent, or Firm—Carroll F. Palmer

[57] ABSTRACT

Attachment devices for automatic focusing cameras which permit the taking of exposures having a visual field different from that attainable with the fixed photographic lens of the camera comprise a conversion lens of different focal length, e.g., wide angle or telephoto, than the camera lens adapted to mount on the front of the camera lens, and refraction means to compensate the automatic movement of the camera lens for the mounting of such conversion lens including a prism to mount on the camera to cover a window on the camera through which light passes to control automatic focusing of the camera lens, such prism being structured to change the path of light passing through the window by a angle D that corresponds to the required alteration in the range of movement of the camera lens when the conversion lens is mounted on the camera.

4 Claims, 5 Drawing Figures

FIG.1
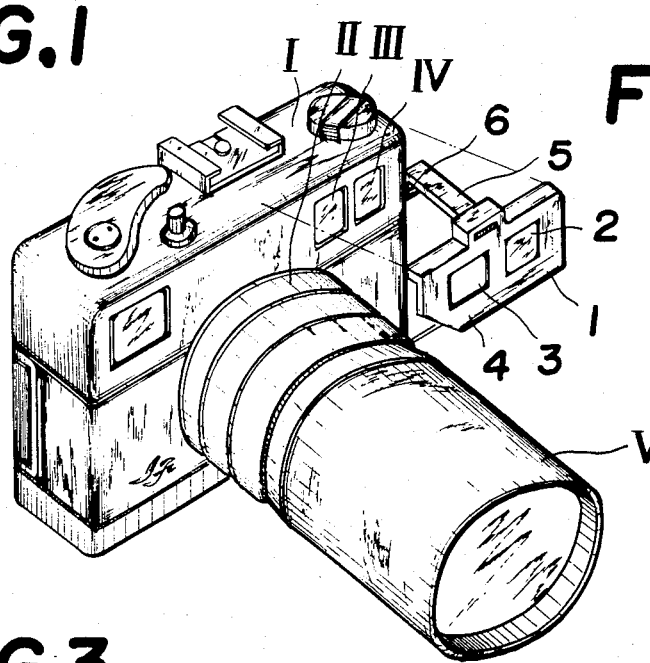
FIG.2
FIG.3
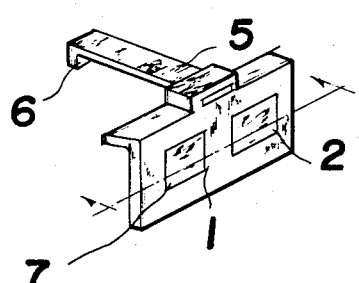
FIG.4
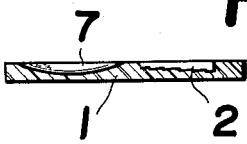
FIG.5
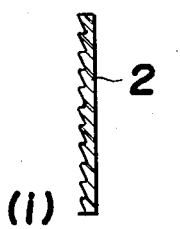
(i)
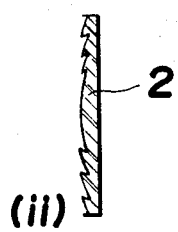
(ii)

4,490,031

DEVICE FOR ADJUSTING MOVEMENT OF PHOTOGRAPHIC LENS AND FIELD OF VIEWFINDER

BACKGROUND OF THE INVENTION

The present invention relates to a device which allows automatic focusing of an automatic focusing camera even when various conversion lenses are used.

Automatic focusing cameras have been recently commercially available which automatically detect a distance between the subject and the camera to focus the photographic lens on the subject. There are two main automatic focusing methods: a method in which light from a subject is received to measure the distance between the subject and the camera; and a method in which light is emitted by a camera to the subject, and the reflected light from the subject is received to measure the distance between the subject and the camera. In both these methods, a distance measuring mechanism is interlinked with a photographic moving mechanism to automatically focus the photographic lens on the subject, since a focal length of a lens mounted on an automatic focusing camera (to be referred to as a photographic lens hereinafter) is set to be constant.

However, such a device cannot be used when a conversion lens such as a telephoto lens or a wide-angle lens is attached to the camera. This is because these conversion lenses have different focal lengths from that of the standard lens.

Therefore, the focal length of the photographic lens may not be kept constant. When a conversion lens is attached to the photographic lens, a synthetic or effective focal length results which is the product of the focal length of the standard lens and the magnification of the conversion lens. In this case, the required range of movement of the photographic lens to provide focusing at a given distance between the subject and the camera is altered.

SUMMARY OF THE INVENTION

It is therefore an object of the present invention to provide a lens movement adjusting mechanism which changes the range of movement of a photographic lens of an automatic focusing camera to automatically focus the photographic lens on the subject even when one of a variety of conversion lenses is attached to the standard lens.

A prism (usually called a "D prism") is provided just in front of and covering a range finder window of the automatic focusing camera. Light is emitted through the prism to the subject and reflected light enters the prism. Alternatively, light emitted from the subject enters the prism. The angle of the D prism is so determined as to alter the range of movement of the photographic lens to provide focusing. When light is emitted from or enters the window, it passes through the "D prism". The incident angle or the transmission angle is changed and transferred to the photographic lens to move it by the appropriate amount to provide automatic focusing even when a conversion lens is used.

Also, when a conversion lens, particularly a telephoto lens or a wide-angle lens is used, an image photographed on the film is in practice either smaller or larger then the field seen through the viewfinder. It is desirable to adjust the field seen through the viewfinder so as to correspond to the image photographed on the film.

It is another object of the present invention to provide a viewfinder field adjusting mechanism for the automatic focusing camera as well as photographic lens movement adjusting mechanism. When a telephoto lens is used, the image actually photographed on the film is smaller than the field seen through the viewfinder. This problem can be solved by providing, just in front of the viewfinder window, a frame having a smaller area than the viewfinder window corresponds to the actual image photographed on the film. Conversely, when a wide-angle lens is used, the image actually photographed on the film is larger than the field seen through the viewfinder. This problem can be solved by providing a concave lens just in front of the viewfinder window. Such a viewfinder field adjusting mechanism comprising a frame or a concave lens is provided integrally with the photographic lens movement adjusting mechanism. A proper device may be selected according to the type of conversion lenses for adjusting the movement of a photographic lens and the field of the viewfinder.

It is still another object of the present invention to provide an inexpensive device of the type described above which is manufactured by monolithic molding of relatively rigid synthetic resins such as an acrylic resin and which has a good outer appearance.

Other objects, features and advantages of the present invention will be apparent from the following detailed description taken in conjunction with the accompanying drawings.

BRIEF DESCRIPTION OF THE DRAWINGS

FIG. 1 is a perspective view showing a conventional automatic focusing camera with an example of a device for adjusting the movement of a photographic lens and the field of the viewfinder according to a first embodiment of the present invention;

FIG. 2 is a sectional view of the device of the first embodiment taken along the alternate long and short dashed line in FIG. 1;

FIG. 3 is a perspective view of a device according to a second embodiment of the present invention;

FIG. 4 is a sectional view of the device of the second embodiment taken along the alternate long and short dashed line in FIG. 3; and FIGS. 5(i) and 5(ii) are enlarged sectional views showing two different shapes respectively of prisms of the device according to the present invention.

DETAILED DESCRIPTION OF THE PREFERRED EMBODIMENTS

FIG. 1 shows a conventional automatic focusing camera I; a photographic lens II a viewfinder window formed at the front of the camera I, and a window IV through which light is emitted to a subject and reflected light enters; alternatively, through which light emitted by the subject enters. These two windows are usually provided side by side. Reference symbol V denotes a conversion lens, for example, telephoto lens or a wide-angle lens, mounted on the standard lens.

Further, also in FIG. 1 reference numeral 1 denotes a rectangular main body, such as an acrylic sheet, of an adjusting device made of a relatively rigid synthetic resin. On one side of the main body 1 (on the right-hand side in the figure) is a photographic lens movement adjusting mechanism, which comprises a prism 2 usually called a D prism large enough to cover the light-emitting/light-receiving window IV of the camera I.

Among several possible shapes of the prism 2, major shapes may be selected from a saw-toothed or wedge shape and a Fresnel lens type shape having a series of wedges or ridges from its periphery toward its center, as is shown in FIGS. 5(i) and 5(ii), respectively.

The angle of the D prism is so determined that it corresponds to the required alteration in the range of movement of a photographic lens when the conversion lens V is attached to the camera I.

On the other side of the main body 1 (on the left-hand side in the figure) is a viewfinder field adjusting mechanism. FIG. 1 shows a case where a telephoto lens is used as the conversion lens V. The main device 1 also comprises a through hole 3 which is of a similar shape as but provides a reduction of the range tinder window III of the camera I, thereby providing a frame 4. The degree of reduction is so determined that the field seen from the through hole 3 coincides with that actually photographed on the film using a telephoto lens.

The main body 1 of the device which has a structure as described above will have a shape corresponding to the shape of the camera to which it is attached. For example, when the photographic lens interferes with the attachment of the main device 1 since the two windows III and IV are located too close to the photographic lens II, corners of the main body 1 of the device may be cut off. The method of attaching the main body 1 to the camera I may also vary.

FIG. 1 shows an example wherein an elongated, flat mounting portion 5 is fixed substantially at the center of the main body 1 of the device and is perpendicular thereto. The mounting portion 5 extends backward for a distance identical to the width of the camera I and has a bending portion 6 extending downward by a short distance.

The mounting portion 5 is thus firmly mounted on the upper side of the camera I when the conversion lens V is attached over the photographic lens II of the camera I by clamping the camera I between the main body 1 and the bending portion 6 of the mounting portion 5. In this case, the prism 2 of the main body 1 and the through hole 3 of the frame 4 are located immediately in front of the window IV from which light is emitted or received and the viewfinder window III of the camera I, respectively.

Therefore, even when the conversion lens V is attached to the automatic focusing camera I, light passing out or received through the window IV of the camera I passes the D prism 2 of the main body 1. Since the angle of this prism corresponds to the required alternation in the range of movement of the photographic lens II, the appropriate incident angle or emitted light to provide automatic focusing is transferred to a photographic lens moving mechanism (not shown) in the camera I.

FIG. 1 shows the case where telephoto lens is attached as a conversion lens. The area of subject seen through the viewfinder window III via the through hole 3 which is defined by the frame 4 of the main body 1 is the same as that actually photographed on the film, thus preventing errors such as failing to photograph desired parts of the subject.

FIGS. 3 and 4 show a case where a wide-angle lens is used as the conversion lens V in which the same reference numerals as used in FIGS. 1 and 2 denote the same parts. The concave lens 7 ajusts the field seen through which the viewfinder window III so as to correspond it to the image actually photographed on the film, in the similar manner as the frame 4, thus preventing errors such as photographing unnecessary parts of the subject.

What is claimed is:

1. An attachment device for an automatic focusing camera which has a window through which light passes to automatically control range of movement of the photograhic lens of said camera when making an exposure by detecting a distance between a subject and said camera plus a viewfinder for determining the visual field to be recorded by said exposure, said device which permits the taking of an exposure having a visual field different from that attainable with said photographic lens comprising;

a conversion lens of different focal length than said photographic lens adapted to mount on the front of said photographic lens, and refraction means to compensate said automatic movement of said photographic lens for the mounting of said conversion lens thereon comprising a prism adapted to mount on said camera to cover said window, said prism being structured to change the path of light passing through said window by a angle D that corresponds to the required alteration in the range of movement of said photographic lens when said conversion lens is mounted on the front thereof.

2. A device according to claim 1 wherein said refraction means comprises viewfinder field adjusting means comprising an integral frame and a concave lens structured to be immediately in front of viewfinder, said concave lens having a magnification power so as to match the visual field seen through said viewfinder plus said concave lens with the visual field to be obtained by said exposure with the combination of said photographic lens and said conversion lens.

3. The device of claim 3 wherein said refraction means comprising said integral prism, frame and concave lens are made of synthetic resin.

4. The method of taking of an exposure having a visual field different from that attainable with the permanent photographic lens of an automatic focusing camera which has a window through which light passes to automatically control range of movement of said photographic lens when making an exposure by detecting a distance between a subject and said camera plus a viewfinder for determining the visual field to be recorded by said exposure which comprises:

mounting a conversion lens of different focal length than said photographic lens on the front of said photographic lens, mounting on said camera refraction means to compensate said automatic movement of said photographic lens for the presence of said conversion lens thereon comprising a prism that covers said window, said prism being structured to change the path of light passing through said window by a angle D that corresponds to the required alteration in the range of movement of said photographic lens when said conversion lens is mounted on the front thereof, and making an exposure with said camera with said conversion lens and said refraction means so mounted.

* * * * *